US012654599B2

(12) United States Patent
Jenkins et al.

(10) Patent No.: US 12,654,599 B2
(45) Date of Patent: Jun. 16, 2026

(54) FOLDABLE VEHICLE SEAT AND METHOD OF ASSEMBLING THE SAME

(71) Applicant: Jaguar Land Rover Limited, Whitley (GB)

(72) Inventors: Adrian Jenkins, Warwick (GB); Alexandru Spatareanu, Leamington Spa (GB); Iain Pickersgill, Coventry (GB); Sasho Kolev, Coventry (GB)

(73) Assignee: JAGUAR LAND ROVER LIMITED, Whitley (GB)

( * ) Notice: Subject to any disclaimer, the term of this patent is extended or adjusted under 35 U.S.C. 154(b) by 101 days.

(21) Appl. No.: 18/703,691

(22) PCT Filed: Oct. 5, 2022

(86) PCT No.: PCT/EP2022/077719
§ 371 (c)(1),
(2) Date: Apr. 22, 2024

(87) PCT Pub. No.: WO2023/066665
PCT Pub. Date: Apr. 27, 2023

(65) Prior Publication Data
US 2025/0001911 A1     Jan. 2, 2025

(30) Foreign Application Priority Data

Oct. 22, 2021     (GB) ..................................... 2115204

(51) Int. Cl.
B60N 2/20          (2006.01)
(52) U.S. Cl.
CPC .................................... B60N 2/206 (2013.01)
(58) Field of Classification Search
CPC .... B60R 2011/0015; B60R 2011/0012; B60N 2/2222; B60N 2/206
See application file for complete search history.

(56) References Cited

U.S. PATENT DOCUMENTS 9,421,914 B2 *  8/2016  Dry ......................... B60N 2/879
10,377,279 B2 *  8/2019  Line ....................... B60N 2/686
(Continued)

FOREIGN PATENT DOCUMENTS

DE          3738931 A1 *  6/1989  ............. B60R 5/006
DE          10215093 A1 *  11/2002  ............. B60R 5/006
(Continued)

OTHER PUBLICATIONS

Combined Search and Examination Report corresponding to application GB2115204.6, dated Apr. 22, 2022, 6 pages.
(Continued)

*Primary Examiner* — Arfan Y. Sinaki
(74) *Attorney, Agent, or Firm* — TROUTMAN PEPPER LOCKE LLP; Dustin B. Weeks; Nicholas H. Doss

(57)                    ABSTRACT

The present disclosure relates generally to a vehicle seat and particularly, but not exclusively, to a foldable vehicle seat with an aperture to provide access to internal components and a method of assembling the same. The present invention includes a vehicle seat comprising: a seat base coupled to a seat back at a hinge, the seat back being configured to pivot about the hinge relative to the seat base between a deployed position and a stowed position; wherein, in the stowed position, the seat back forms at least a part of a load bearing floor of a vehicle loadspace; wherein the seat back comprises: a frame having an aperture for access through the seat back between a rear of the seat back and a front of the seat back; and a removable load bearing aperture cover for covering the aperture.

15 Claims, 6 Drawing Sheets

(56) References Cited

U.S. PATENT DOCUMENTS

| | | | |
|---|---|---|---|
| 10,457,170 B2 | 10/2019 | Line et al. | |
| 11,787,322 B2 * | 10/2023 | Turletti | B60N 3/002 |
| | | | 297/146 |
| 2010/0314920 A1 | 12/2010 | Arata et al. | |
| 2013/0049433 A1 | 2/2013 | Kajihara | |
| 2014/0042792 A1 | 2/2014 | Kajiwara | |
| 2018/0326882 A1 | 11/2018 | Bach et al. | |
| 2020/0047645 A1 | 2/2020 | Hamdoon et al. | |
| 2020/0156519 A1 | 5/2020 | Yu | |
| 2021/0114491 A1 | 4/2021 | Cotta et al. | |

FOREIGN PATENT DOCUMENTS

| | | | | |
|---|---|---|---|---|
| DE | 102007002680 A1 * | 7/2008 | | B60R 5/006 |
| DE | 202018104293 U1 | 8/2018 | | |
| FR | 2743589 A1 * | 7/1997 | | B60R 5/006 |
| FR | 3086899 A1 | 4/2020 | | |
| JP | 2002347490 A | 12/2002 | | |

OTHER PUBLICATIONS

International Search Report and Written Opinion corresponding to application PCT/EP2022/077719, dated Mar. 6, 2023, 10 pages.

* cited by examiner

FOLDABLE VEHICLE SEAT AND METHOD OF ASSEMBLING THE SAME

TECHNICAL FIELD

The present disclosure relates to a vehicle seat. Particularly, but not exclusively, the present disclosure relates to a foldable vehicle seat with an aperture to provide access to internal components.

Aspects of the invention relate to a vehicle seat, to a method of assembly of a vehicle seat, and to a vehicle.

BACKGROUND

It is known to provide vehicle second row seats which are foldable to increase the size of a vehicle loadspace in the vehicle. Such seats are constructed by adding components to a seat frame in layers, with various electronic, electrical and pneumatic components being attached to the seat frame first, followed by seat foam and then seat trim to form a complete vehicle seat arrangement. It may be necessary to connect the electronic, electrical and pneumatic components to wider vehicle systems following the introduction of the seat foam and the seat trim to the seat frame.

It is an aim of the present invention to address one or more of the disadvantages associated with the prior art.

SUMMARY OF THE INVENTION

Aspects and embodiments of the invention provide a vehicle seat, a method of assembly of a vehicle seat, and a vehicle as claimed in the appended claims.

According to an aspect of the present invention there is provided a vehicle seat back comprising: a frame having an aperture for access through the seat back between a rear of the seat back and a front of the seat back; and a removable aperture cover for covering the aperture. The vehicle seat back may be coupled, via a hinge, to a seat base to provide a vehicle seat which may be placed in a deployed position and a stowed position.

According to an aspect of the present invention there is provided a vehicle seat comprising: a seat base coupled to a seat back at a hinge, the seat back being configured to pivot about the hinge relative to the seat base between a deployed position and a stowed position; wherein, in the stowed position, the seat back forms at least a part of a load bearing floor of a vehicle loadspace; wherein the seat back comprises: a frame having an aperture for access through the seat back between a rear of the seat back and a front of the seat back; and a removable load bearing aperture cover for covering the aperture.

An advantage of this aspect of the invention is that access or restriction of access through the vehicle seat back can be selectively provided by the operation of the removable load bearing aperture cover.

The vehicle seat may be a second row seat of a vehicle, where the second row seat can be placed in the stowed position to increase the size of the vehicle loadspace. This provides the advantage of flexibility in the arrangement of the vehicle interior when the vehicle seat is positioned and operated within the vehicle.

The vehicle seat may comprise a carrier board located on the front of the seat back, reducing access to the aperture from the front of the seat back and forming a carrier board cavity between the carrier board and the seat back, wherein, when access to the front of the seat back has been reduced, the aperture provides access to the carrier board cavity through the rear of the seat back. The carrier board cavity may house one or more of electronic systems, electrical systems, or pneumatic systems that are to be connected. This provides the advantage of providing a structure for internal mounting of vehicle seat components within the vehicle seat assembly whilst maintaining access to the seat components.

The vehicle seat may comprise seat foam located on the front of the seat back, reducing access to the aperture from the front of the seat back and forming a seat foam cavity between the seat foam and the seat back, wherein, when access to the front of the seat back has been reduced, the aperture provides access to the seat foam cavity through the rear of the seat back. This provides the advantage of maintaining access to the internal seat components even when a layer of seat foam is positioned on the front of the seat back.

The carrier board and the carrier board cavity may be located, at least in part, within the seat foam cavity. The seat foam cavity may house one or more of electronic systems, electrical systems, or pneumatic systems that are to be connected.

The vehicle seat may comprise a seat trim covering, at least in part, the seat foam, further reducing access to the aperture from the front of the seat back.

The frame of the seat back may comprise a tether point capable of withstanding a predetermined load.

The load bearing aperture cover may be removably coupled to the frame of the seat back via fastening means. The load bearing aperture cover of the seat back may comprise a tether point capable of withstanding a predetermined load. This provides the advantage of allowing a tether point for the seat to be optimally positioned on the seat back, whilst retaining optimal access to the internal seat components of the vehicle seat.

The fastening means, coupling the load bearing aperture cover to the frame of the seat back, may be capable of withstanding the predetermined load on the tether point. This provides the advantage of maintaining the structural integrity of the tether point on the vehicle seat when the tether point is located on the load bearing aperture cover.

The seat back may be connected, in use, to the vehicle via the hinge with the seat base. This provides the advantage of allowing the vehicle seat to be freestanding. The seat back may be additionally connected, when in the deployed position, at an upper part of the seat back to another connection point on the vehicle. This provides the advantage of allowing a different configuration of vehicle seats of the invention.

According to an aspect of the invention, there is provided a method of assembly of a vehicle seat, the method comprising: coupling a seat back to a seat base via a hinge, the seat back having an aperture for access through the seat back between a rear of the seat back and a front of the seat back and being configured to pivot about the hinge relative to the seat base between a deployed position and a stowed position, wherein, in the stowed position the seat back forms at least a part of a load bearing floor of a vehicle loadspace; attaching seat foam to the front of the seat back, the seat foam reducing access to the aperture from the front of the seat back; connecting one or more electronic systems, electrical systems, or pneumatic systems required for seat operation, via the aperture in the rear of the seat back; and connecting a load bearing aperture cover to the rear of the seat back, over the aperture, preventing access to the one or more electronic systems, electrical systems, or pneumatic systems, through the aperture in the seat back.

An advantage of this aspect of the invention is that assembly of the vehicle can be carried out to a finished state prior to the connection of one or more electronic systems, electrical systems, or pneumatic systems required for seat operation. An advantage of this aspect of the invention is that access through the vehicle seat back can be provided, restricted, or prevented, by the operation of the removable load bearing aperture cover.

The method may comprise: attaching a carrier board to the front of the seat back prior to attachment of the seat foam, the carrier board reducing access to the aperture from the front of the seat back. This provides the advantage of providing a structure for internal mounting of vehicle seat components within the vehicle seat assembly whilst maintaining access to the seat components.

The method may comprise: attaching a seat trim to the seat foam, the seat trim reducing access to the aperture from the front of the seat back.

The method may comprise: when the seat foam and the seat trim have been attached to the front of the seat back, inserting an escutcheon through the seat trim and the seat foam, the escutcheon being configured to receive a shaft of a headrest component of the vehicle seat, the shaft having a hollow inner conduit carrying electrical wires for connection to one or more electrical connectors located at the aperture in the seat back. This provides the advantage of retaining the seat foam and seat trim in place whilst providing an aperture through the seat from the outside of the seat, to the inside of the seat, in order for electrical wires from a connected or coupled headrest component to be positioned within the seat for connection to vehicle systems and/or electrical power.

The method may comprise: inserting the shaft of the headrest component of the vehicle seat into the escutcheon such that the electrical wires, for electrical components in the headrest component, are routed from the headrest component through the escutcheon to position terminal ends of the electrical wires at the one or more electrical connectors located at the aperture in the seat back.

According to an aspect of the invention, there is provided a vehicle comprising a vehicle seat according to any preceding aspect or a vehicle seat assembled according to any preceding aspect.

Within the scope of this application it is expressly intended that the various aspects, embodiments, examples and alternatives set out in the preceding paragraphs, in the claims and/or in the following description and drawings, and in particular the individual features thereof, may be taken independently or in any combination. That is, all embodiments and/or features of any embodiment can be combined in any way and/or combination, unless such features are incompatible. The applicant reserves the right to change any originally filed claim or file any new claim accordingly, including the right to amend any originally filed claim to depend from and/or incorporate any feature of any other claim although not originally claimed in that manner.

BRIEF DESCRIPTION OF THE DRAWINGS

One or more embodiments of the invention will now be described, by way of example only, with reference to the accompanying drawings, in which.

DETAILED DESCRIPTION

A vehicle seat in accordance with an embodiment of the present invention is described herein with reference to the accompanying FIGS. 1 to 5. A method of assembly of a vehicle seat in accordance with an embodiment of the present invention is described herein with reference to the accompanying FIG. 6. A vehicle in accordance with an embodiment of the present invention is described herein with reference to the accompanying FIG. 7.

Figure 1:
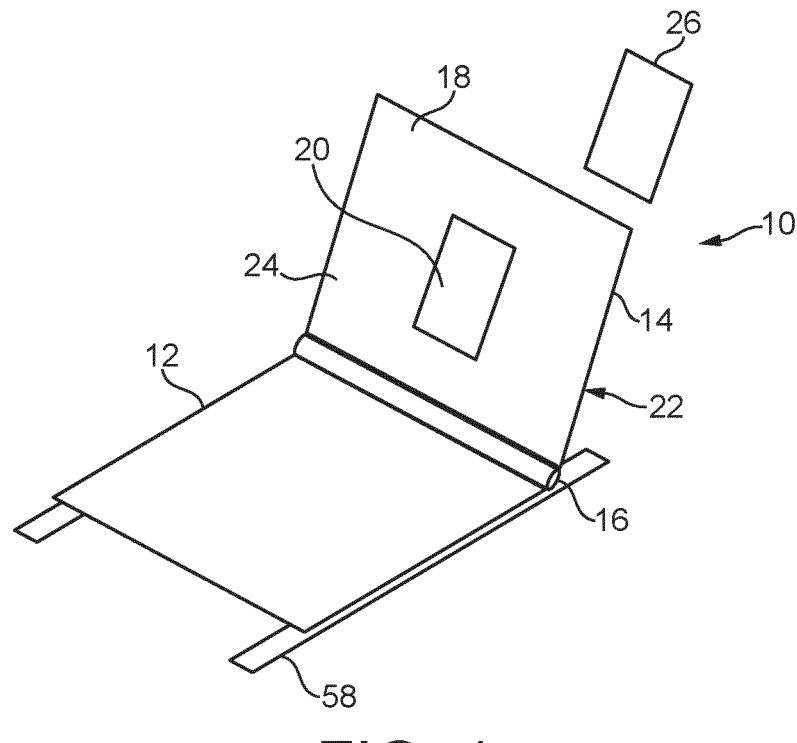
FIG. 1 illustrates a schematic perspective view of a vehicle seat in a deployed condition according to an embodiment of the invention.
Figure 2:
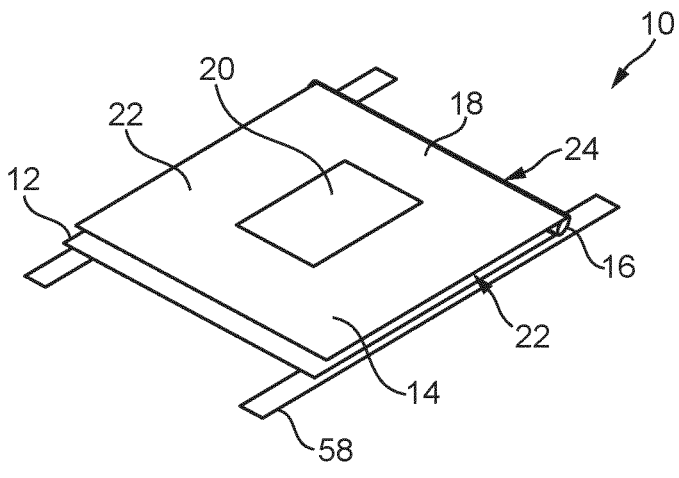
FIG. 2 illustrates a schematic perspective view of a vehicle seat in a stowed condition according to an embodiment of the invention.

With reference to FIGS. 1 and 2, there is shown a vehicle seat 10 according to an embodiment of the present invention. FIG. 1 illustrates a deployed position of the vehicle seat 10 and FIG. 2 illustrates a stowed position of the vehicle seat.

The vehicle seat 10 comprises a seat base 12 coupled to a seat back 14 at, or by, a pivot or hinge 16. The seat base 12 may be coupled to the seat back 14 at, or by, a plurality of pivots or hinges 16, and these may pivot or hinge in the same plane. For example there may be a pivot or hinge 16 at both lateral sides of the vehicle seat 10, allowing the seat back 14, to pivot or hinge relative to the seat base 12 to bring the seat back 14 and seat base 12 into substantially a parallel and overlapping configuration. The seat base 12 is portion of the vehicle seat 10 upon which a user sits whilst travelling in a vehicle 100 in which the vehicle seat 10 is located. The seat back 14 is the portion of the vehicle seat 10 upon which the user's back rests when sat in the vehicle seat 10, for example whilst travelling in the vehicle 100.

The hinge 16 has a first component at or near one end of the seat base 12. The hinge 16 has a second component at or near one end of the seat back 14. The seat base 12 and seat back 14 together may be considered to form a seat frame of the vehicle seat 10.

The first component of the hinge 16 is rotatably coupled to the second component of the hinge 16, such that the seat base 12 and seat back 14 are connected, or coupled, together to form a vehicle seat frame of a vehicle seat 10, the seat back 14 being arranged, or configured, to pivot about the hinge 16 relative to the seat base 12 between a deployed position or condition, where the seat back 14 is substantially upright allowing a user to sit upon the vehicle seat 10, and a stowed position or condition, where the seat back 14 is substantially horizontal, that is substantially parallel with the direction of travel of the vehicle 100 in normal use. The stowed position may alternatively be called a folded vehicle seat position.

In the stowed position, illustrated in FIG. 2, the front of the seat back 14 is arranged to be substantially parallel to, and facing, the seat base 12, and to be, at least in part, overlapping the seat base 12, such that the seat base 12 is no longer operable for a user to sit upon.

When the seat back 14 is substantially vertical, as illustrated in FIG. 1, it will be understood that the seat back 14 is in such a position that a user would be able to rest their back upon the seat back 14 in the course of use of the vehicle seat 10.

When the seat back 14 is substantially horizontal, as illustrated in FIG. 2, it will be understood that the seat back 14 is in such a position that a user would not be able to rest their back upon the seat back 14 in the course of use of the vehicle seat 10.

Figure 7:
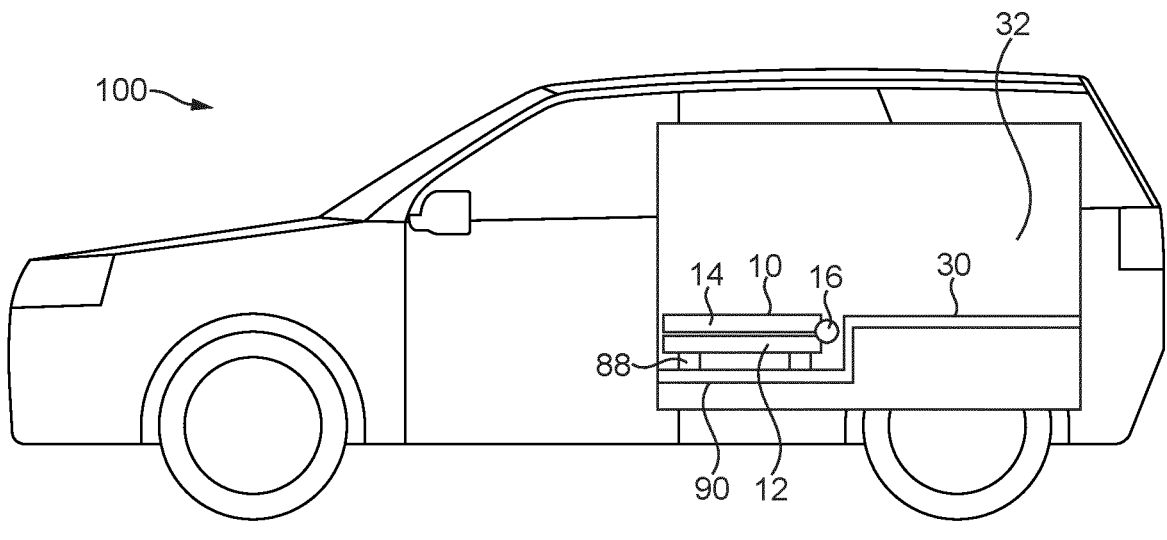
FIG. 7 illustrates a vehicle in accordance with an embodiment of the invention.

When in the stowed position, the seat back 14 forms at least a part of, or a continuation of a load bearing floor 30 of a vehicle loadspace 32, as illustrated in FIG. 7. The loadspace 32 may be, for example, a cargo space of a vehicle 100, or a luggage compartment of a vehicle 100. The section of load bearing floor 30 formed by the stowed seat back 14 covers, at least in part, the seat base 12.

The seat back 14 comprises a frame 18 having an access hatch, a hole or an aperture 20 for access through the seat back 14 between a rear 22 of the seat back 14 and a front 24 of the seat back 14. That is, the aperture 20 provides access for a user to at least be able to pass a tool, or a hand, through the seat back 14 from the rear 22 of the seat back 14 to the front 24 of the seat back 14. The front 24 of the seat back 14 is that side of the seat back 14 at which a user would be positioned, or which faces the user of the vehicle seat 10, when the user is seated on the vehicle seat 10. When in the stowed position, the rear 22 of the seat back 14 is substantially horizontal, and faces upwards to perform the function of a load bearing floor 30 of the vehicle 100.

When the front 24 of the seat back 14 is subsequently covered in various seat materials, such as seat foam 40 and seat trim 42, as illustrated in FIG. 3 *a*, the aperture 20 allows access through the seat back 14 from the rear 22 of the seat back 14.

Having an aperture 20 in the seat back 14 may assist in the assembly of the vehicle seat 10 by an initial supplier of the vehicle seat 10, and may also assist with in-plant and in-service investigation of any vehicle seat issues, without the need to fully disassemble the vehicle seat 10, and in particular without having to remove any seat foam 40 and seat trim 42 that is located on, or fixed to, the seat frame 18 of the seat back 14.

In some embodiments, vehicle seat foam 40 may be configured to provide an internal cavity 44 of the vehicle seat 10, that is, a space between the seat foam 40 and the seat back 14. This may be called the seat foam cavity 44. Therefore the access through the aperture 20 from the rear 22 of the seat back 14 provides user access to any components within the seat foam cavity 44 of the vehicle seat 10, such components being, for example, electrical harnesses and systems that need to be connected after seat foam 40 and seat trim 42 has been added or applied to the seat back 14, or the frame 18 of the seat back 14.

The seat back 14 comprises a removable aperture cover 26 for covering the aperture 20. By covering the aperture 20, access through the seat back 14 is restricted or prevented. That is, access through the seat back 14 to an internal cavity, such as seat foam cavity 44, of the vehicle seat 10 is restricted or prevented when the vehicle seat back 14 has been constructed to comprise the frame 18 with various coverings, such as seat foam 40 and seat trim 42.

The aperture cover 26 may be a load bearing aperture cover 26. The load bearing aperture cover 26 may be constructed of any material capable of withstanding the loads to be applied to the load bearing aperture cover 26. The construction of the load bearing aperture cover 26 may affect the load capabilities of the load bearing aperture cover 26. For example, ribs or reinforcements may be provided on the load bearing aperture cover 26 to provide additional strength. In various embodiments, a steel cover, an aluminium cover, a carbon fibre cover, or a plastic cover may be suitable for the load bearing aperture cover 26. For example, the load bearing aperture cover 26 may be required to hold a static 100 kg load, or another predetermined load, which is sufficient to withstand normal luggage loading, or a kneeling force of a user who is within the vehicle loadspace 32.

In one embodiment, the vehicle seat 10 is a second row vehicle seat of a vehicle 100, where the second row vehicle seat 10 can be placed in the stowed position to increase the size of the vehicle loadspace 32. In other words, by stowing the second row vehicle seat 10, a larger cargo or luggage loading space or compartment may be provided in the vehicle 100. In addition, or alternatively, a vehicle seat 10 may be provided as a third row vehicle seat, where the third row vehicle seat 10 can be placed in the stowed position to increase the size of the vehicle loadspace 32 in the vehicle 10. Therefore in a vehicle 10 with three rows of seats, the described vehicle seat 10 can be provided as a third row of seats only, or the described vehicle seat 10 can be provided as a second row of seats only, or the vehicle seat 10 arrangement may be applied to both the second row of seats and the third row of seats.

In some embodiments, the vehicle seat 10 comprises a carrier board 46 located on, or connected to, the front 24 of the seat back 14. Such a carrier board may cover, at least in part, the aperture 20, reducing, or preventing, access to the aperture 20 from the front 24 of the seat back 14 and forming a carrier board cavity 48 between the carrier board 46 and the seat back 14. The carrier board cavity 48 may be located, at least in part, at the location of the aperture 20, and be suitable for containing electronic systems or components thereof, electrical systems or components thereof, pneumatic systems or components thereof, or other systems or components thereof required for seat operation, and these may be retained, at least in part by the carrier board 46, for example using clips or retainers attached to the carrier board 46 which are arranged or configured to connect or hold the various systems or components thereof.

Some of the various systems and components that may be retained within the vehicle seat 10, include pneumatic systems to drive seat massage subsystems and bolster support subsystems, power adjustment systems for a seat headrest 76, for example three axis seat headrest adjustment electrics and electronics, seat adjustment electronics, noise cancelling amplifiers and speakers in the headrest 76, video systems in the headrest 76, mobile device charging systems, climate systems that heat, cool, and ventilate the vehicle seat 10, and the various electrical harness connections for such systems and components.

The carrier board cavity 48 may be configured to house one or more of electronic systems, electrical systems, or pneumatic systems that are to be connected within the carrier board cavity 48 to wider vehicle systems, for example a vehicle electronic control unit (ECU).

The carrier board 46 can be connected to the seat back 14 via fastening means. Such fastening means may be in the form of bolts, screws, clips or other fasteners. When access to the front 24 of the seat back 14 has been reduced, or prevented, by the application of a carrier board 46 on the front 24 of the seat back 14, the aperture 20 provides access to the carrier board cavity 48 through the rear 22 of the seat back 14. That is, access to the various electronic systems, electrical systems, pneumatic systems or other systems required for seat operation, retained within the carrier board cavity 48, can be provided through the aperture 20.

The vehicle seat may comprise seat foam 40, or similar seat padding material, located on the front 24 of the seat back 14, reducing, or preventing, access to the aperture 20 from the front 24 of the seat back 14. The seat foam 40 may form a seat foam cavity 44 between the seat foam 40 and the seat back 14. The seat foam cavity 44 may overlay, at least in part, the aperture 20.

When access to the front 24 of the seat back 14 has been reduced, or prevented, by the application of seat foam 40 on the front 24 of the seat back 14, the aperture 20 provides access to the seat foam cavity 44 through the rear 22 of the seat back 14. That is, access to the various electronic systems, electrical systems, pneumatic systems or other systems required for seat operation, retained within the seat foam cavity 44, can be provided through the aperture 20.

The seat foam cavity 44 may therefore be configured to house one or more of electronic systems, electrical systems, or pneumatic systems that are to be connected within the seat foam cavity 44 to wider vehicle systems, for example a vehicle ECU.

In embodiments where a carrier board 46 is affixed, connected, or coupled, to the seat back 14, the seat foam 40 may be affixed, connected, or coupled to the carrier board 46 or may be formed integrally therewith. For example a pre-constructed arrangement of seat foam 40 attached, for example by bonding, to a carrier board 46 can be affixed, connected, or coupled to the seat back 14 as one integral unit. The carrier board 46 can be formed as part of the seat foam 40, such that the seat foam 40 forms a seat foam cavity 44 between the seat foam 40 and the seat back 14.

The carrier board 46 may be positioned, at least in part, within the seat foam cavity 44 formed by the seat foam 40. That is, the carrier board 46 is positioned between the seat foam 40 and the seat back 14, such that the seat foam 40 is required to have a seat foam cavity 44 sized to retain the carrier board 46 between the seat foam 40 and the seat back 14. In such an arrangement, the carrier board 46 and the carrier board cavity 48 are located, at least in part, within the seat foam cavity 44.

Alternatively, in an embodiment in which a carrier board 46 is not used, the seat foam 40 may directly overlay the electronic systems, electrical systems, pneumatic systems or other systems required for seat operation without forming a seat foam cavity 44. In such an alternative arrangement, when access to the front 24 of the seat back 14 has been reduced or prevented, by the application of seat foam 40 on the front 24 of the seat back 14, the aperture 20 provides access to the electronic systems, electrical systems, pneumatic systems or other systems required for seat operation, through the rear 22 of the seat back 14.

The vehicle seat 10 may comprise a seat trim 42 which covers, at least in part, the seat foam 40. Seat trim may be formed of any suitable material such as nylon, polyester, leather, synthetic leather, or other material. In particular the seat trim 42 may cover the part of the seat foam 40 that will be exposed to the seat user, in use. The seat trim 42 further reduces, or prevents, access to the aperture 20 from the front 24 of the seat back 14.

When access to the front 24 of the seat back 14 has been reduced, or prevented, by the application of seat trim 42 over the seat foam 40 located at the front 24 of the seat back 14, the aperture 20 provides access to the seat foam cavity 44 or carrier board cavity 48 through the rear 22 of the seat back 14.

In some embodiments the frame 18 of the seat back 14 comprises a tether anchor point or tether point 50 capable of withstanding a predetermined load. That is, the tether point 50 is capable of withstanding, for example, an applied load which may be in the range of 1 kN to 20 kN. The tether point 50 is intended to retain a load in place, for example a child seat retained on the vehicle seat 10, during a rapid deceleration event, such as may be experienced during a vehicle accident. Such a predetermined tether load value may be determined with regards to local vehicle laws. In one embodiment, the predetermined load value for the tether point 50 is 5 kN. Therefore, the maximum rated load of the tether point 50 may be 5 kN.

In the construction of the frame 18 of the seat back 14, the frame 18 may comprise vertical strengthening members 52, such as upright members or struts, and may alternatively or additionally comprise horizontal strengthening members 54, such as cross members or struts, to provide structural rigidity around the aperture 20 and/or around a tether point 50. Such vertical and horizontal strengthening members may be provided by the construction of the seat back 14. In one example the seat back 14 is formed by pressing sheet material, for example sheet steel, to form areas of increased structural rigidity, for example raised vertical and horizontal sections to provide resistance to deformity in horizontal and vertical directions. In another example a second skin of seat back material may be provided, on the seat back 14, which comprises preformed box sections, where the second skin is welded, or otherwise affixed to the seat back 14. In other embodiments strengthening members may be welded, bolted, or otherwise affixed, to the seat back 14 at appropriate locations to provide the required structural strength for the vehicle seat 10.

In one embodiment, vertical strengthening members 52 and/or horizontal strengthening members 54 are provided at positions where the load bearing aperture cover 26 is to be fixed, connected, or coupled, to the seat back 14. The load bearing aperture cover 26 is removably coupled, or connected, to the frame 18 of the seat back 14 via fastening means, for example clips, screws or bolts.

Although the tether point 50 may be located on the frame 18 of the seat back 14, it may also be provided within the aperture 20 over which the load bearing aperture cover 26 is to be positioned, or on the load bearing aperture cover 26 itself.

When the load bearing aperture cover 26 of the seat back 14 comprises a tether point 50, that tether point 50 is configured to be capable of withstanding a predetermined load, as described above. For example a load bearing aperture cover 26 mounted tether point 50 may be configured to be capable of withstanding, for example, a 5 kN load. Since the load bearing aperture cover 26 is removably coupled, or connected, to the frame 18 of the seat back 14 via fastening means, for example clips, screws or bolts, those fastening means are capable of withstanding the predetermined load on the tether point 50. For example the fastening means is, or are, configured to be capable of withstanding, for example, a 5 kN load.

When a tether point 50 is connected to the load bearing aperture cover 26, then the material of the load bearing aperture cover 26 is chosen from those materials capable of withstanding the predetermined load on the tether point 50 that the load bearing aperture cover 26 would be expected to withstand in normal use.

If there is no tether point 50 connected to the load bearing aperture cover 26, the forces that the material is required to withstand may be lower, and may, for example be the loading forces to be placed on the load bearing aperture cover 26 when the seat back 14 is in the stowed position to form a load bearing floor 30 of the vehicle loadspace 32. For example, the load bearing aperture cover 26 may be required to hold a static load which may be exhibited during normal luggage loading, or a kneeling force of a user who is within the vehicle loadspace 32.

Alternatively, the load bearing aperture cover 26 may have a small aperture through which a tether point 50, which is attached to the frame 18 of the seat back 14, projects or is accessible. In such an example, the tether point 50 may be connected to the seat frame 18 via strengthening members or struts straddling the aperture 20.

The seat back 14 may be connected, in use, to the vehicle 100 via the hinge 16 with the seat base 12. In some embodiments the seat back 14 may be connected, in use, to the vehicle 100 only via the hinge 16 with the seat base 12. When the vehicle seat 10 is a freestanding seat, the seat back 14 is only connected or coupled to the vehicle 100 via the hinge 16 with the seat base 12, where the seat base 12 is coupled to a body of the vehicle 100. The seat base 12 may be coupled to the body of the vehicle 100 either through bolts 88, or similar fixings, directly to a floor member 90 of the body of the vehicle 100, or via rails 58 coupled to the floor member 90 of the body of the vehicle 100, the rails 58 allowing longitudinal movement of the vehicle seat 10.

In some embodiments, the seat back 14 may be additionally connected, when in the deployed position, at an upper part 60 of the seat back 14 to another connection point on the vehicle 100. Such an arrangement may be termed a top latch seat, where generally a latch part 62 on the seat back 14 is part of, integral with or attached to the frame 18 of the seat back 14. The latch part 62, is configured to engage with a corresponding latch part on the body of the vehicle 100, or connected to the body of the vehicle 100, to assist in preventing movement of the seat back 14.

Once the load bearing aperture cover 26 is positioned to cover the aperture 20, a back board or back panel may be applied to the back 22 of the vehicle seat 10. Such a back panel may be covered in seat trim and provide additional strength and rigidity to the seat back 14, or may merely provide an aesthetic covering to the seat back 14.

Figure 3A:
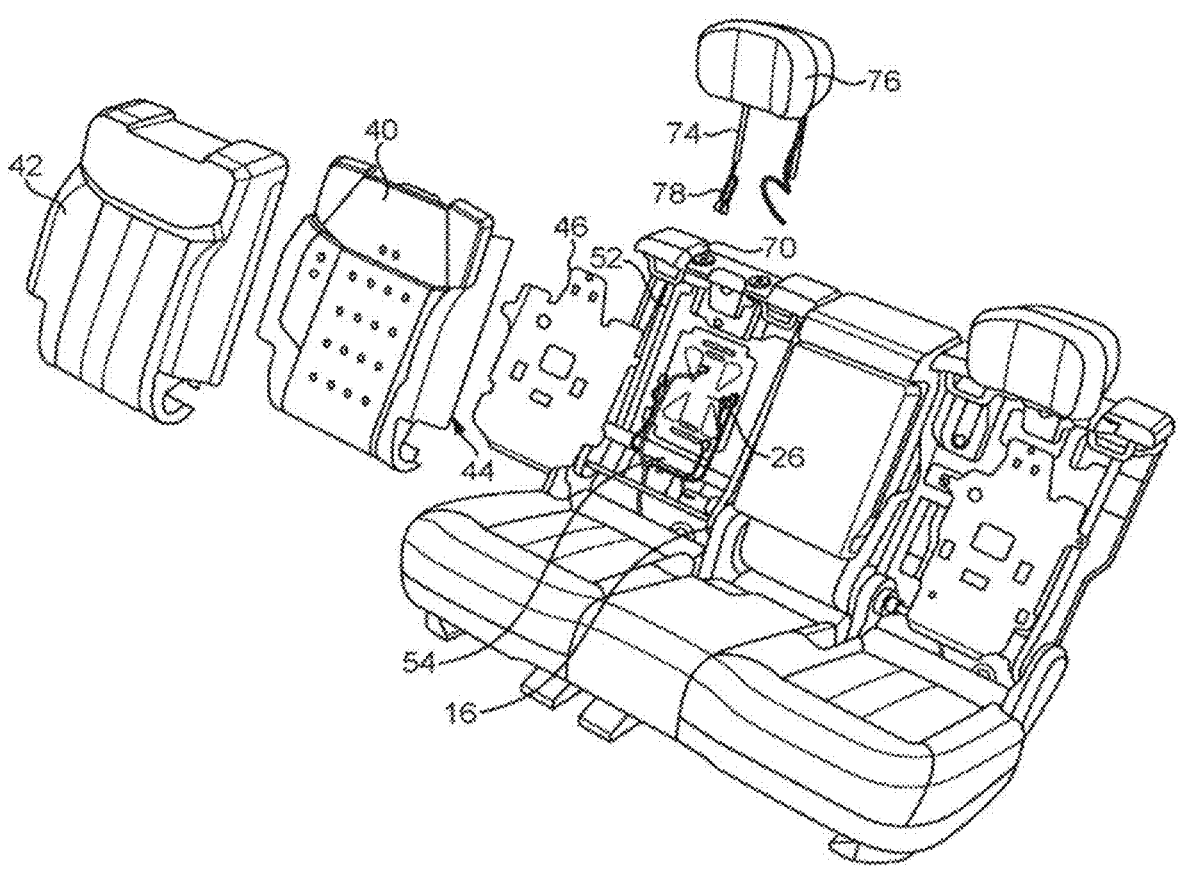
FIG. 3*a* illustrates an exploded perspective view of a vehicle seat in a deployed condition according to an embodiment of the invention.
Figure 3B:
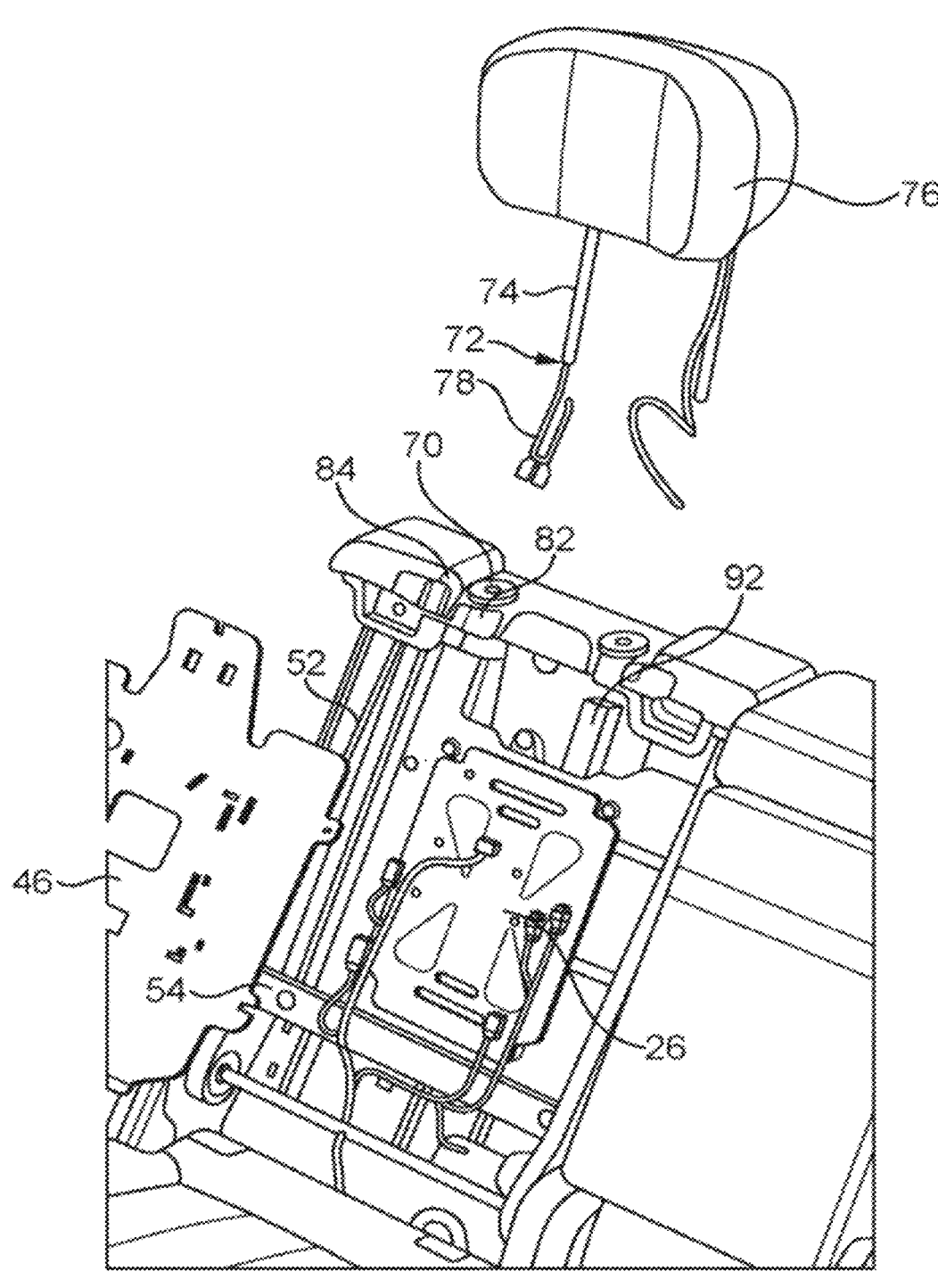
FIG. 3*b* illustrates a magnified view of part of FIG. 3*a*, illustrating an exploded perspective view of the vehicle seat in a deployed condition according to an embodiment of the invention.
Figure 6:
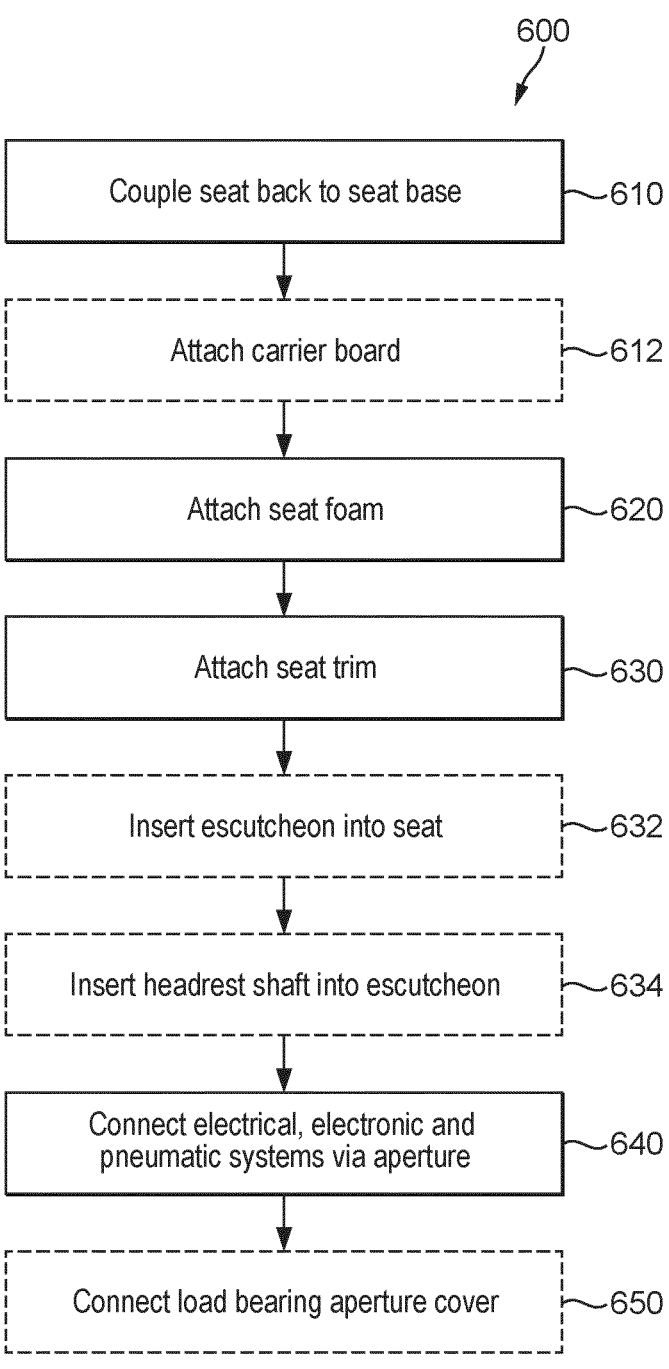
FIG. 6 is a flow diagram of a method according to an embodiment of the invention.

FIG. 3a illustrates an exploded perspective view of a vehicle seat 10, illustrating the components for assembly of a vehicle seat. FIG. 3b is an enlarged partial view of the vehicle seat 10 as shown in FIG. 3a. FIG. 6 provides a flow chart of the blocks of the method 600 of assembly of the vehicle seat 10.

At block 610, a seat back 14 is coupled to a seat base 12 via a hinge 16 or a plurality of hinges 16, the seat back 14 having an aperture 20 for access through the seat back 14 between a rear 22 of the seat back 14 and a front 22 of the seat back 14 and being configured to pivot about the hinge 16 relative to the seat base 12 between a deployed position and a stowed position, wherein, in the stowed position the seat back 14 forms at least a part of a load bearing floor 30 of a vehicle loadspace 32.

At block 620, seat foam 40 or other seat padding is attached to the front 24 of the seat back 14, the seat foam 40 reducing, or preventing, access to the aperture 20 from the front 24 of the seat back 14. The seat foam 40 may be retained on the seat back 14 using fastening means, for example in the form of clips, or may be adhered to the seat back 14, for example by using glue or adhesive strips.

At block 630, a seat trim 42 is attached to the seat foam 40, the seat trim 42 reducing, or preventing, access to the aperture 20 from the front 24 of the seat back 14.

Figures 4, 5:
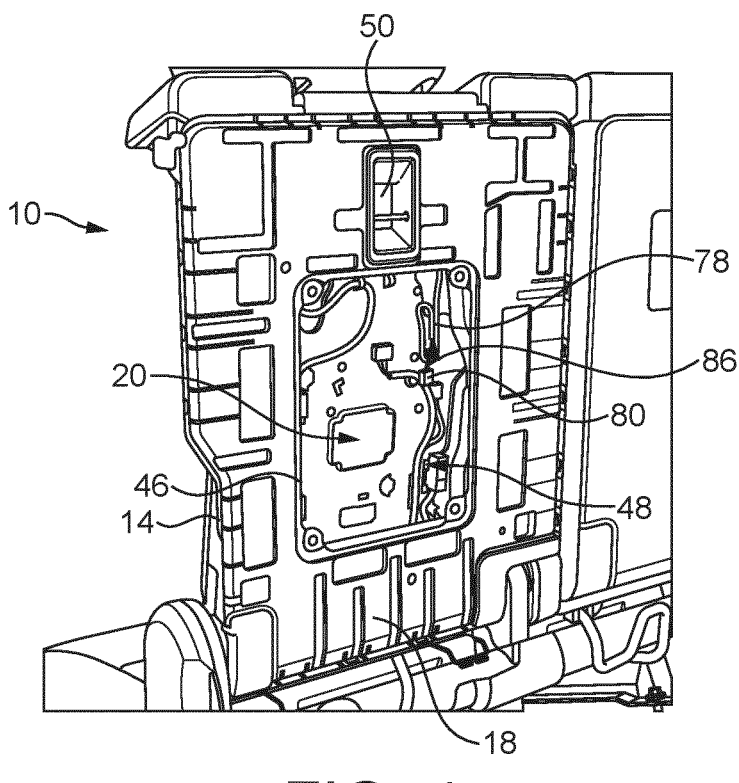
FIG. 4 illustrates a perspective view of the rear of a vehicle seat back according to an embodiment of the invention.
FIG. 5 illustrates a perspective view of the rear of a vehicle seat back according to an embodiment of the invention.

At block 640, one or more electronic systems, electrical systems, or pneumatic systems required for seat operation, are connected via the aperture 20 in the rear 22 of the seat back 14. FIG. 4 and FIG. 5 further illustrate the positioning of systems relative to apertures 20 in the vehicle seat 10. Thus, the aperture 20 provides access for a user to be able to connect any electronic, electrical or pneumatic systems within the vehicle seat 10 itself.

At block 650, a load bearing aperture cover 26 is connected to the rear 22 of the seat back 14, over the aperture 20, thereby preventing access to the one or more electronic systems, electrical systems, or pneumatic systems, through the aperture 20 in the seat back 14.

Optionally, at block 612, prior to attachment of seat foam 40 or other padding to the front 24 of the seat back 14 a carrier board 46 may be attached to the front 24 of the seat back 14, the carrier board 46 reducing, or preventing, access to the aperture 20 from the front 24 of the seat back 14.

Optionally in one embodiment, at block 632, when the seat foam 40 and the seat trim 42 have been attached to the front 24 of the seat back 14, an escutcheon 70, most clearly seen in FIG. 3b, is inserted through the seat trim 42 and the seat foam 40, the escutcheon 70 being configured to receive a shaft 74 of a headrest 76 component of the vehicle seat 10, the shaft 74 having a hollow inner conduit 72 carrying electrical wires 78 for connection to one or more electrical connector 80, as illustrated in FIG. 4, located at the aperture 20 in the seat back 14. The shaft 74 of the headrest 76 once inserted through the escutcheon 70 may then be connected to a structural component 92 on the seat back 14, to retain the headrest 76 in place during normal vehicle operation. The structural component 92, may be a tubular receptacle for receiving the shaft 74 of the headrest 76, and preventing it from moving laterally or longitudinally, and only allowing movement in the vertical axis.

The escutcheon 70 may comprise a headrest guide sleeve or a duct 82, through the seat trim 42 and seat foam 40, for receiving the shaft 74 of the headrest 76. The escutcheon 70 may further comprise a cap 84 for covering the holes through the seat foam 40 and seat trim 42 through which the shaft 74 of the headrest 76 is inserted, and for retaining the seat foam 40 and seat trim 42 in place on the seat back 14. The cap may also provide for locking the height of the headrest 76 in a desired position.

Optionally, in one embodiment, at block 634, the shaft 74 of the headrest 76 of the vehicle seat 10 is inserted into the escutcheon 70 such that the electrical wires 78, for electrical components in the headrest 76, are routed from the headrest 76 through the escutcheon 70 to position terminal ends 86 of the electrical wires 78 at the one or more electrical connector 80 located at the aperture 20 in the seat back 14. The terminal ends 86 of the electrical wires 78 can then be physically connected to the one or more electrical connector 80 via the aperture 20, without difficulty for the user. Therefore manufacturing of the described vehicle seat 10 can be significantly simplified, resulting in less manufacturing errors requiring rework, and providing for ease of maintenance of vehicle seat components.

FIG. 7 illustrates a vehicle 100 comprising a vehicle seat 10 as described above, or assembled as described above, where the vehicle seat 10 may be operable to be placed in a stowed position such that the seat back 14 is substantially horizontal to effectively extend the load bearing floor 30 of a vehicle loadspace 32.

It will be appreciated that various changes and modifications can be made to the present invention without departing from the scope of the present application.

The invention claimed is:

1. A vehicle seat comprising:

a seat base coupled to a seat back at a hinge, the seat back being configured to pivot about the hinge relative to the seat base between a deployed position and a stowed position; wherein, in the stowed position, the seat back forms at least a part of a load bearing floor of a vehicle loadspace;

wherein the seat back comprises:

a frame having an aperture for access through the seat back between a rear of the seat back and a front of the seat back;

a removable load bearing aperture cover for covering the aperture; and a carrier board located on the front of the seat back, reducing access to the aperture from the front of the seat back and forming a carrier board cavity between the carrier board and the seat back, wherein, when access to the front of the seat back has been reduced, the aperture provides access to the carrier board cavity through the rear of the seat back.

2. The vehicle seat of claim 1, wherein the vehicle seat is a second row seat of a vehicle, where the second row seat is configured to be placed in the stowed position to increase the size of the vehicle loadspace.

3. The vehicle seat of claim 1, wherein the carrier board cavity houses one or more of electronic systems, electrical systems, or pneumatic systems that are configured to be connected.

4. The vehicle seat of claim 1, wherein the vehicle seat further comprises seat foam located on the front of the seat back, reducing access to the aperture from the front of the seat back and forming a seat foam cavity between the seat foam and the seat back, wherein, when access to the front of the seat back has been reduced, the aperture provides access to the seat foam cavity through the rear of the seat back.

5. The vehicle seat of claim 4, wherein the carrier board and the carrier board cavity are located, at least in part, within the seat foam cavity.

6. The vehicle seat of claim 4, wherein the seat foam cavity houses one or more of electronic systems, electrical systems, or pneumatic systems that are configured to be connected.

7. The vehicle seat of claim 4, wherein the vehicle seat further comprises a seat trim covering, at least in part, the seat foam, further reducing access to the aperture from the front of the seat back.

8. The vehicle seat of claim 1, wherein the frame of the seat back comprises a tether point capable of withstanding a predetermined load.

9. The vehicle seat of claim 1, wherein the load bearing aperture cover is removably coupled to the frame of the seat back via fastening means, optionally wherein the fastening means, are configured to withstand a predetermined load.

10. The vehicle seat of claim 1, wherein the seat back is connected to a vehicle via the hinge with the seat base, optionally wherein the seat back is connected, when in the deployed position, at an upper part of the seat back to another connection point on the vehicle.

11. A vehicle comprising the vehicle seat of claim 1.

12. A method of assembly of a vehicle seat, the method comprising:

coupling a seat back to a seat base via a hinge, the seat back having an aperture for access through the seat back between a rear of the seat back and a front of the seat back and being configured to pivot about the hinge relative to the seat base between a deployed position and a stowed position, wherein, in the stowed position the seat back forms at least a part of a load bearing floor of a vehicle loadspace;

attaching seat foam to the front of the seat back, the seat foam reducing access to the aperture from the front of the seat back;

connecting one or more electronic systems, electrical systems, or pneumatic systems required for seat operation, via the aperture in the rear of the seat back; and connecting a load bearing aperture cover to the rear of the seat back, over the aperture, preventing access to the one or more electronic systems, electrical systems, or pneumatic systems, through the aperture in the seat back.

13. The method of assembly of a vehicle seat of claim 12, the method further comprising:

attaching a carrier board to the front of the seat back prior to attachment of the seat foam, the carrier board reducing access to the aperture from the front of the seat back.

14. The method of assembly of a vehicle seat of claim 12, the method further comprising:

attaching a seat trim to the seat foam, the seat trim reducing access to the aperture from the front of the seat back.

15. The method of assembly of a vehicle seat of claim 14, the method further comprising:

when the seat foam and the seat trim have been attached to the front of the seat back, inserting an escutcheon through the seat trim and the seat foam, the escutcheon being configured to receive a shaft of a headrest component of the vehicle seat, the shaft having a hollow inner conduit carrying electrical wires for connection to one or more electrical connectors located at the aperture in the seat back, optionally wherein the method comprises:

inserting the shaft of the headrest component of the vehicle seat into the escutcheon such that the electrical wires, for electrical components in the headrest component, are routed from the headrest component through the escutcheon to position terminal ends of the electrical wires at the one or more electrical connectors located at the aperture in the seat back.

* * * * *